United States Patent
Vecera et al.

(10) Patent No.: US 9,904,735 B2
(45) Date of Patent: Feb. 27, 2018

(54) CAMERA-ACTIVATED DATA TRANSFER FROM A SOURCE COMPUTING DEVICE TO A TARGET COMPUTING DEVICE

(71) Applicant: Red Hat, Inc., Raleigh, NC (US)

(72) Inventors: Martin Vecera, Brno (CZ); Jiri Pechanec, Mokra-Horakov (CZ)

(73) Assignee: Red Hat, Inc., Raleigh, NC (US)

( * ) Notice: Subject to any disclaimer, the term of this patent is extended or adjusted under 35 U.S.C. 154(b) by 0 days.

(21) Appl. No.: 15/147,295

(22) Filed: May 5, 2016

(65) Prior Publication Data

US 2017/0323024 A1   Nov. 9, 2017

(51) Int. Cl.
```
G06F 17/30      (2006.01)
H04L 29/08      (2006.01)
G06K 19/06      (2006.01)
H04W 4/00       (2018.01)
```
(52) U.S. Cl.
CPC . *G06F 17/30876* (2013.01); *G06K 19/06037* (2013.01); *G06K 19/06112* (2013.01); *H04L 67/06* (2013.01); *H04W 4/008* (2013.01)

(58) Field of Classification Search
CPC ................................................ G06F 17/30879
USPC ......................................................... 235/375
See application file for complete search history.

(56) References Cited

U.S. PATENT DOCUMENTS

| | | |
|---|---|---|
| 6,580,704 B1 | 6/2003 | Wellig et al. |
| 8,296,477 B1 | 10/2012 | Polk |
| 9,264,480 B1 * | 2/2016 | Saylor ..................... H04L 67/06 |
| 2009/0303036 A1 * | 12/2009 | Sahuguet .......... G06F 17/30047 340/539.13 |
| 2013/0221084 A1 * | 8/2013 | Doss ..................... H04W 12/06 235/375 |
| 2013/0228624 A1 | 9/2013 | Byrd et al. |
| 2014/0074714 A1 * | 3/2014 | Melone ................ G06Q 20/322 705/44 |

(Continued)

FOREIGN PATENT DOCUMENTS

WO   2014063883 A1   5/2014

OTHER PUBLICATIONS

Author Unknown, "Introducing Mesh it up! Connect. Share. Enjoy. ," Mesh it up, 2016, Date Accessed: Feb. 26, 2016, 6 pages, http://www.meshitup.com/.

(Continued)

*Primary Examiner* — Toan Ly
(74) *Attorney, Agent, or Firm* — Withrow & Terranova, PLLC (57) ABSTRACT

Mechanisms for transferring data from a source computing device to a target computing device are provided. A filename identifier (ID) that identifies a file stored on the source computing device is presented on a display device. A selection of the filename ID is received. A unique identifier is generated, and association data that associates the unique identifier with the file is generated. The unique identifier is encoded into a coded image. The coded image is presented on the display device. A first file transfer request is received via a communications interface from a target computing device to transfer the file via the communications interface to the target computing device. The first file transfer request includes an identifier. Responsive to receiving the first file transfer request, the file is sent to the target computing device.

14 Claims, 9 Drawing Sheets

(56) References Cited

U.S. PATENT DOCUMENTS

2014/0258707 A1 9/2014 Denny
2015/0082410 A1 3/2015 Fitzgerald et al.
2015/0163302 A1 6/2015 Armstrong et al.

OTHER PUBLICATIONS

Bruce, Ivy, "Two Ways to Transfer Data from Old Motorola to New One," Recovery-Android Studio, 2016, Date Accessed: Feb. 22, 2016, 8 pages, https://www.recovery-android.com/transfer-data-from-motorola-to-new-one.html.
Casabona, Joe, "Transfer Filed Through QR Codes with Scansfer," Android.AppStorm, May 18, 2011, 9 pages, http://android.appstorm.net/reviews/utilities/transfer-files-through-qr-codes-with-scansfer/.
Dobie, Alex, "SuperBeam: Transfer files using Wifi Direct, NFC or QR codes," Android Central, Apr. 8, 2013, 11 pages, http://www.androidcentral.com/superbeam-transfer-files-using-wifi-direct-nfc-or-qr-codes.
J., Michael et al., "Transfer Files from Your PC to an Android Device Using QR Codes," VisiHow, Date Accessed: Apr. 27, 2016, 6 pages, http://visihow.com/Transfer_Files_from_Your_PC_to_an_Android_Device_Using_Qr_Codes.
Zibreg, Christian, "Portal for iOS: wireless file transfers from your computer to iPhone made easy," iDownloadBlog, Aug. 26, 2015, 7 pages, http://www.idownloadblog.com/2015/08/26/portal-for-ios-wireless-file-tansfers-between-your-computer-and-iphone-made-easy/.

\* cited by examiner

CAMERA-ACTIVATED DATA TRANSFER FROM A SOURCE COMPUTING DEVICE TO A TARGET COMPUTING DEVICE

TECHNICAL FIELD

The examples relate generally to transferring data from a source computing device to a target computing device, and, in particular, to a camera-activated mechanism for transferring data from a source computing device to a target computing device.

BACKGROUND

Allowing a target computing device to copy data from a source computing device creates an opportunity for unwanted copying of the data by a third device. This is particularly true when data is copied via a wireless technology. Under such circumstances, a hacking device may listen to wireless transmissions between the target computing device and the source computing device, glean certain information, and request the data from the source computing device in the same manner as the target computing device requested the data and thereby illicitly obtain a copy of the data.

SUMMARY

The examples relate to camera-activated data transfer mechanisms from a source computing device to a target computing device. The examples help ensure that a wireless transfer of data, such as one or more files stored on the source computing device, is initiated by a target computing device that is in visual proximity of the source computing device, and that such wireless transfer utilizes a unique identifier that is valid for only a single transfer of the data. Subsequent requests for data from the source computing device using the unique identifier are rejected.

In one example a method for transferring data from a source computing device to a target computing device is provided. The method includes providing on a display device a filename identifier (ID) that identifies a file stored on the source computing device. The method further includes receiving, by the source computing device, a selection of the filename ID. The method further includes generating a unique identifier, and generating association data that associates the unique identifier with the file. The method further includes encoding the unique identifier into a coded image. The method further includes presenting the coded image on the display device. The method further includes receiving a first file transfer request via a wireless communications interface from the target computing device to transfer the file via the wireless communications interface to the target computing device. The first file transfer request includes an identifier. The method further includes, responsive to receiving the first file transfer request, sending the file to the target computing device.

In one example, the method further includes accessing the association data that associates the unique identifier with the file, and determining that the identifier matches the unique identifier prior to sending the file to the target computing device. In one example, the method further includes invalidating the association data. A second file transfer request is received via a wireless communications interface from a device to transfer the file via the wireless communications interface to the device, the second file transfer request including the unique identifier. It is determined that no association between the unique identifier and the file exists. In response to determining that no association between the unique identifier and the file exists the file is not transferred to the device in response to the second file transfer request.

In another example, a source computing device is provided. The source computing device includes a communications interface to communicate with a network and a display device. The source computing device further includes a processor device coupled to the communications interface and the display device. The processor device is to provide on the display device a filename identifier (ID) that identifies a file stored on the source computing device. A selection of the filename ID is received. A unique identifier is generated, and association data that associates the unique identifier with the file is generated. The unique identifier is encoded into a coded image. The coded image is presented on the display device. A first file transfer request is received via a communications interface from a target computing device to transfer the file via the communications interface to the target computing device. The first file transfer request includes an identifier. Responsive to receiving the first file transfer request, the file is sent to the target computing device.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

The examples set forth below represent the information necessary to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the examples are not limited to any particular sequence of steps. The use herein of ordinals in conjunction with an element is solely for distinguishing what might otherwise be similar or identical labels, such as "first file" and "second file," and does not imply a priority, a type, an importance, or other attribute, unless otherwise stated herein. As used herein and in the claims, the articles "a" and "an" in reference to an element refer to "one or more" of the element unless otherwise explicitly specified.

The examples relate to camera-activated data transfer mechanisms from a source computing device to a target computing device. The examples help ensure that a wireless transfer of data, such as one or more files stored on the source computing device, is initiated by a target computing device that is in visual proximity of the source computing device, and that such wireless transfer utilizes a unique identifier that is valid for only a single transfer of the data. Subsequent requests for data from the source computing device using the unique identifier are rejected. Thus, among other advantages, the examples help eliminate illicit wireless transfers of data from the source computing device by a hacking computing device.

Figure 1A:
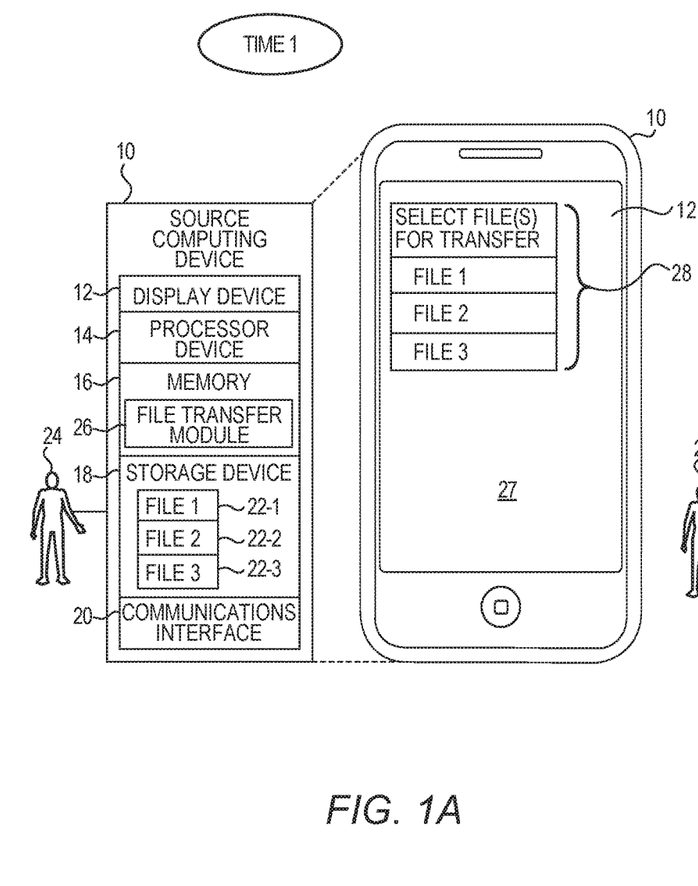
FIGS. 1A-1H illustrate one example of a camera-activated mechanism for transferring data from a source computing device to a target computing device.

FIGS. 1A-1H illustrate one example of a camera-activated mechanism for transferring data from a source computing device to a target computing device. Referring first to FIG. 1A, a source computing device 10 includes a display device 12, a processor device 14, a memory 16, a storage device 18 and a communications interface 20. The source computing device 10 may comprise any suitable computing device, such as a laptop or desktop computer, a smartphone, a computing tablet, or the like.

The storage device 18 includes data, such as one or more files 22-1-22-3. In one example, a user 24 manipulates the source computing device 10 to initiate a file transfer module 26. While the precise manipulation may differ depending on the particular source computing device 10, in one example the display device 12 comprises a touch sensitive screen, and the display device 12 may present an icon (not illustrated) associated with the file transfer module 26. The user 24 may touch the icon to initiate the file transfer module 26. Because the file transfer module 26 is a component of the source computing device 10, functionality implemented by the file transfer module 26 may be generally attributed to the source computing device 10. Moreover, in examples where the file transfer module 26 comprises software instructions that program the processor device 14 to carry out functionality discussed herein, functionality implemented by the file transfer module 26 may be attributed herein to the processor device 14.

In one example, the file transfer module 26, upon initiation, examines the storage device 18 and identifies data stored on the storage device 18, such as the files 22-1-22-3. The file transfer module 26 may present a user interface 27 on the display device 12 that includes a file selection dialog 28 that contains filename identifiers (IDs) of the files 22-1-22-3. The file selection dialog 28 allows an individual, such as the user 24, to select one or more of the files 22-1-22-3 for transfer to a target computing device (not illustrated in FIG. 1A) by selecting one or more of the filename IDs.

Figure 1B:
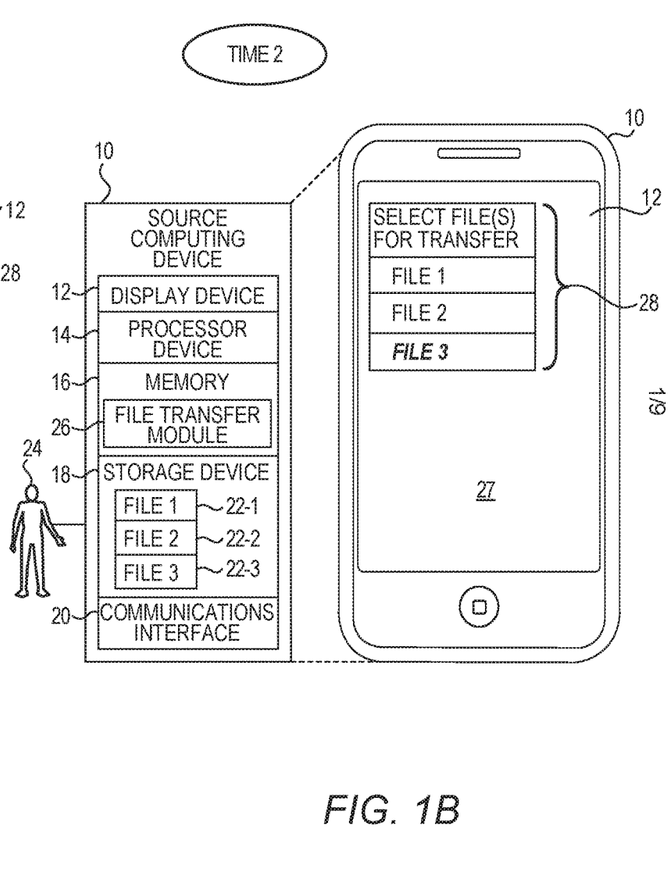

FIG. 1B illustrates the user 24 selecting a single file 22-3 for transfer to the target computing device via a selection of the filename ID associated with the file 22-3. Upon receipt of the selection of the filename ID, the file transfer module 26 generates a unique ID. The unique ID may be generated in any desired manner. In one example, a random number generator is utilized to generate a random number, and the random number is used to generate the unique ID. In some examples, the unique identifier comprises a uniform resource identifier. For purposes of illustration, only a single file is illustrated as being selected. In other examples the user 24 may select multiple files, such as each of the files 22-1-22-3, for transfer.

Figure 1C:
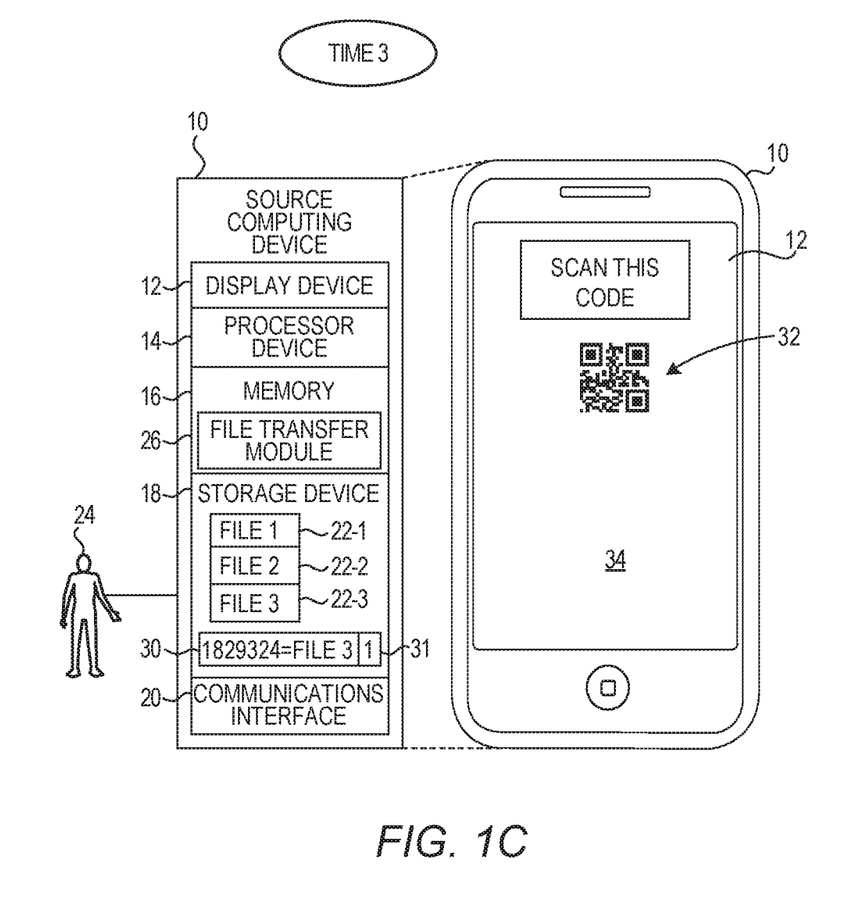

FIG. 1C illustrates the source computing device 10 at a point in time after the unique ID (in this example, "1829324") has been generated. The file transfer module 26 generates association data 30 that associates the unique ID with the file 22-3. If the user 24 had selected multiple files, the association data 30 associates the unique ID with each selected file. The association data 30 may include a valid association flag 31 that indicates whether the association data 30 is valid or not. The file transfer module 26 also encodes the unique ID into a coded image 32, and presents the coded image 32 on the display device 12. The file transfer module 26 may also present a user interface 34 on the display device 12 that directs the target computing device to capture the coded image 32. The coded image 32 may comprise any suitable encoding. In one example, the coded image 32 is a QR code.

Figure 1D:
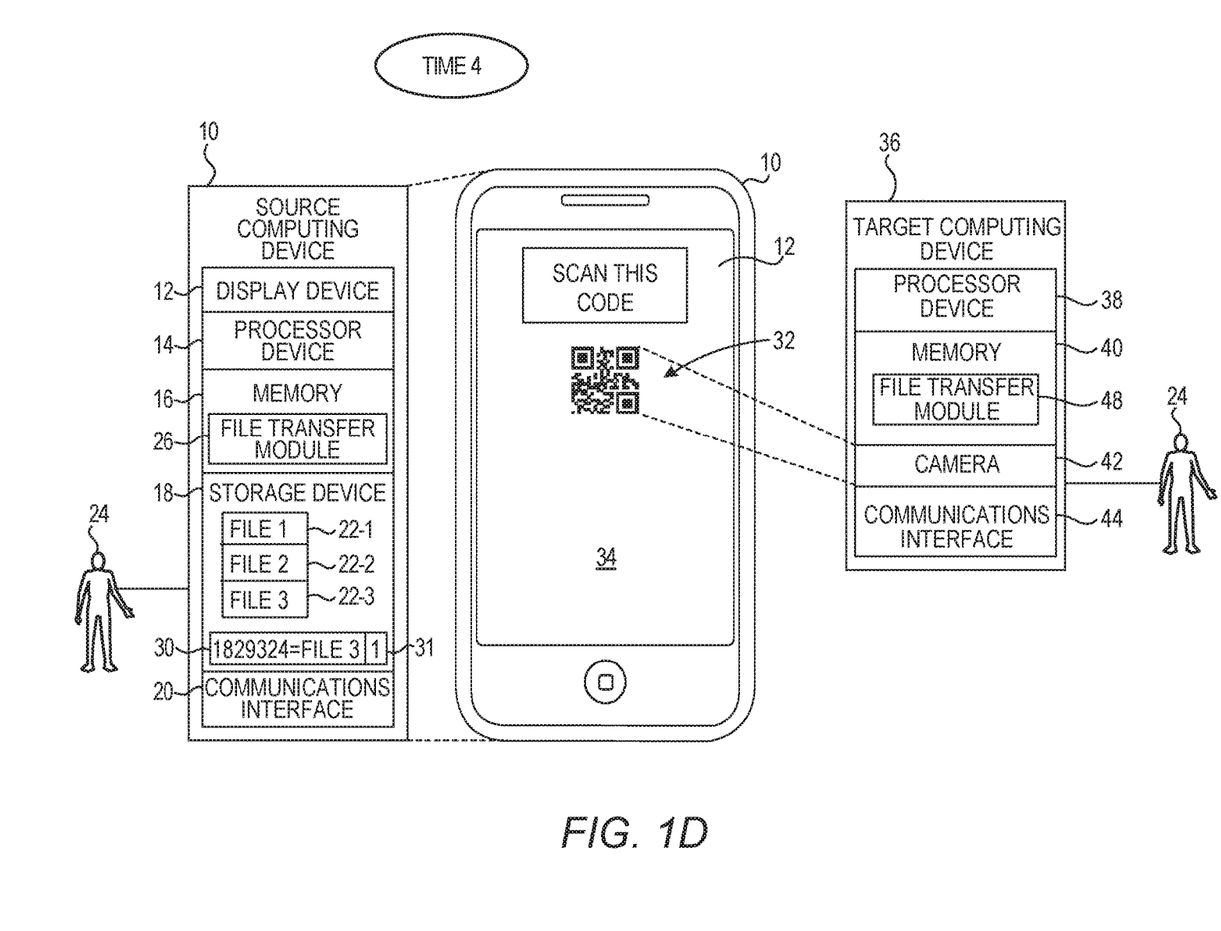

FIG. 1D illustrates a target computing device 36 according to one example. The target computing device 36 includes a processor device 38, a memory 40, a camera 42, and a communications interface 44. The target computing device 36 may comprise, by way of non-limiting example, a smartphone, computing tablet, or any other computing device that includes, or is coupled to, a camera. The user 24 (or another user) initiates a file transfer module 48. The user 24 positions the target computing device 36 to allow the camera 42 to capture the coded image 32 depicted on the display device 12.

The file transfer module 48 decodes the coded image 32 to derive the unique ID. The target computing device 36 establishes a wireless connection with the source computing device 10 via any suitable wireless technology, such as, by way of non-limiting example, Bluetooth, Zigbee, or WiFi.

Figure 1E:
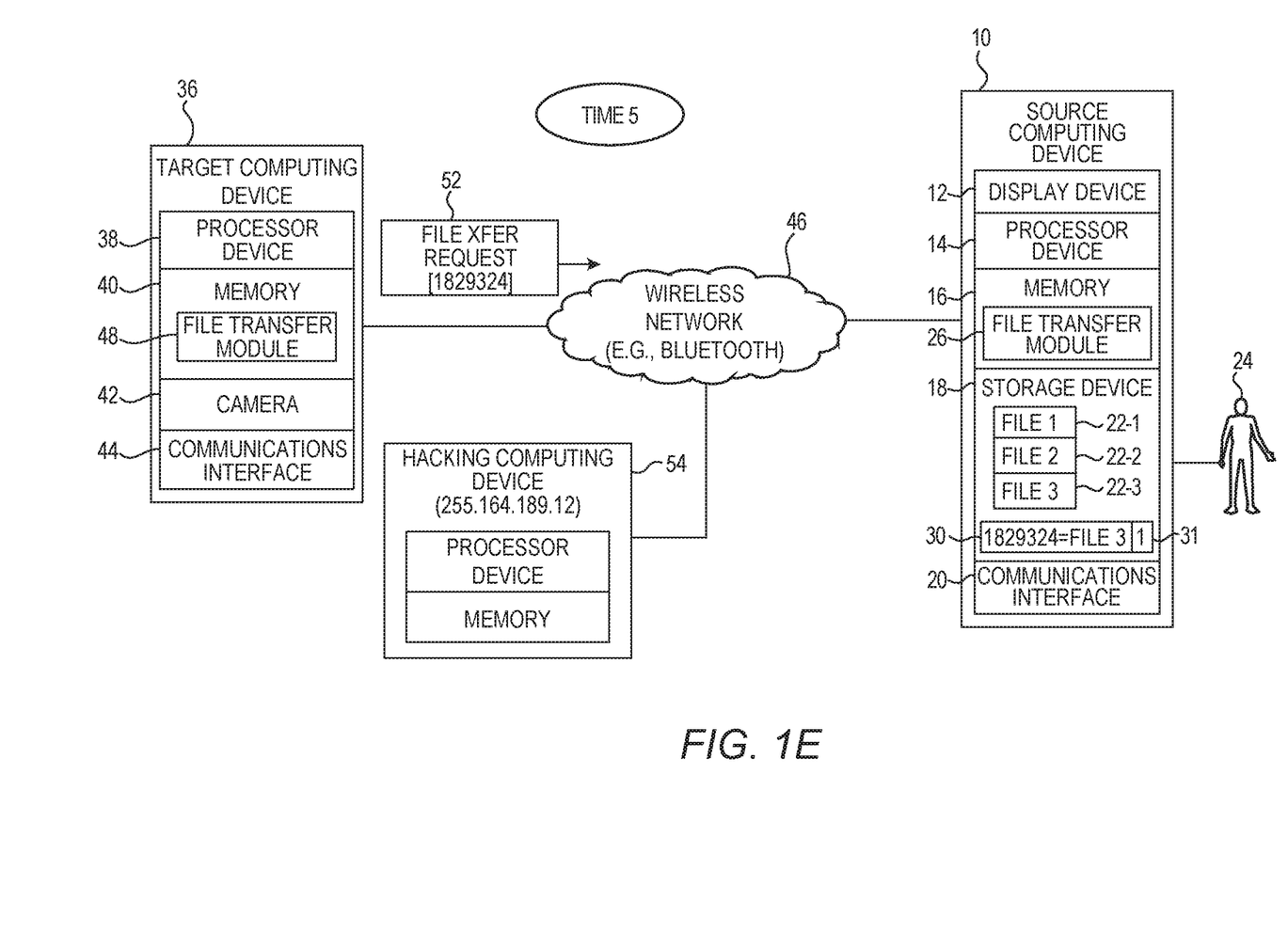

FIG. 1E illustrates the source computing device 10 and the target computing device 36 communicatively coupled via a network 46 according to one example. The target computing device 36 generates a first file transfer request 52 that includes the unique ID, and sends the first file transfer request 52 to the source computing device 10. Assume, for purposes of illustration, that a hacking computing device 54 surreptitiously receives the first file transfer request 52.

Figure 1F:
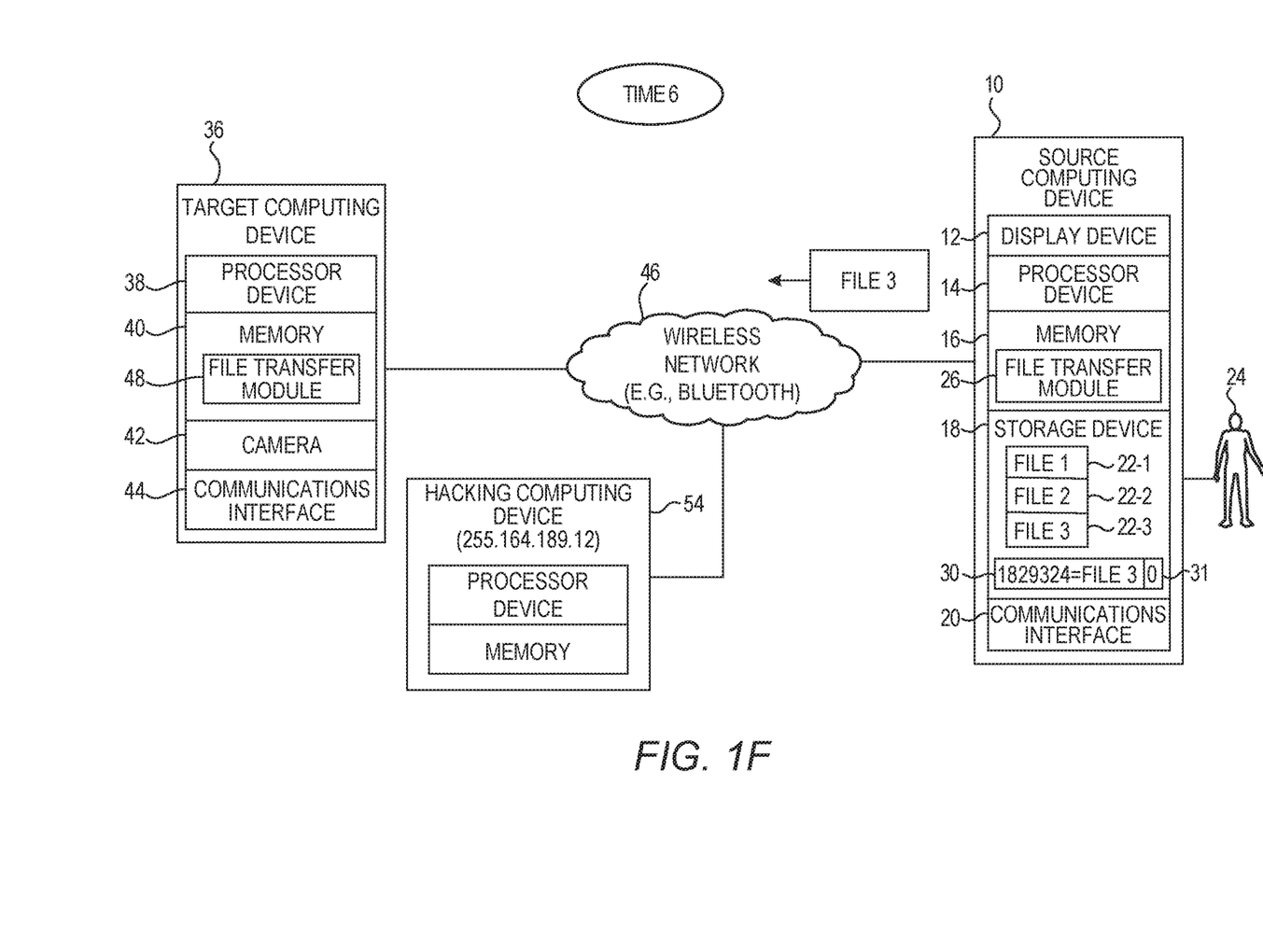

FIG. 1F illustrates the source computing device 10, the target computing device 36, and the hacking computing device 54 at a subsequent point in time. The source computing device 10 receives the first file transfer request 52. The source computing device 10 extracts the unique ID from the first file transfer request 52. The source computing device 10 accesses the association data 30 and determines that the unique ID extracted from the first file transfer request 52 matches the unique ID that is identified in the association data 30. The source computing device 10 removes the association between the unique ID and the file 22-3 by setting the valid association flag 31 to a value, such as '0,' to indicate that the association of the unique ID with the file 22-3 is no longer valid because a request to transfer the file has been received. In other example, the source computing device 10 may remove the association between the unique ID and the file 22-3 by deleting the association data 30 from the memory 16. The source computing device 10 wirelessly sends the file 22-3 to the target computing device 36. If the user 24 had selected multiple files 22, the source computing device 10 wirelessly sends each selected file 22 to the target computing device 36.

In one example, the source computing device 10 communicates with target computing device 36 via a predetermined port that remains the same over time, thereby facilitating communications through a firewall.

Figure 1G:
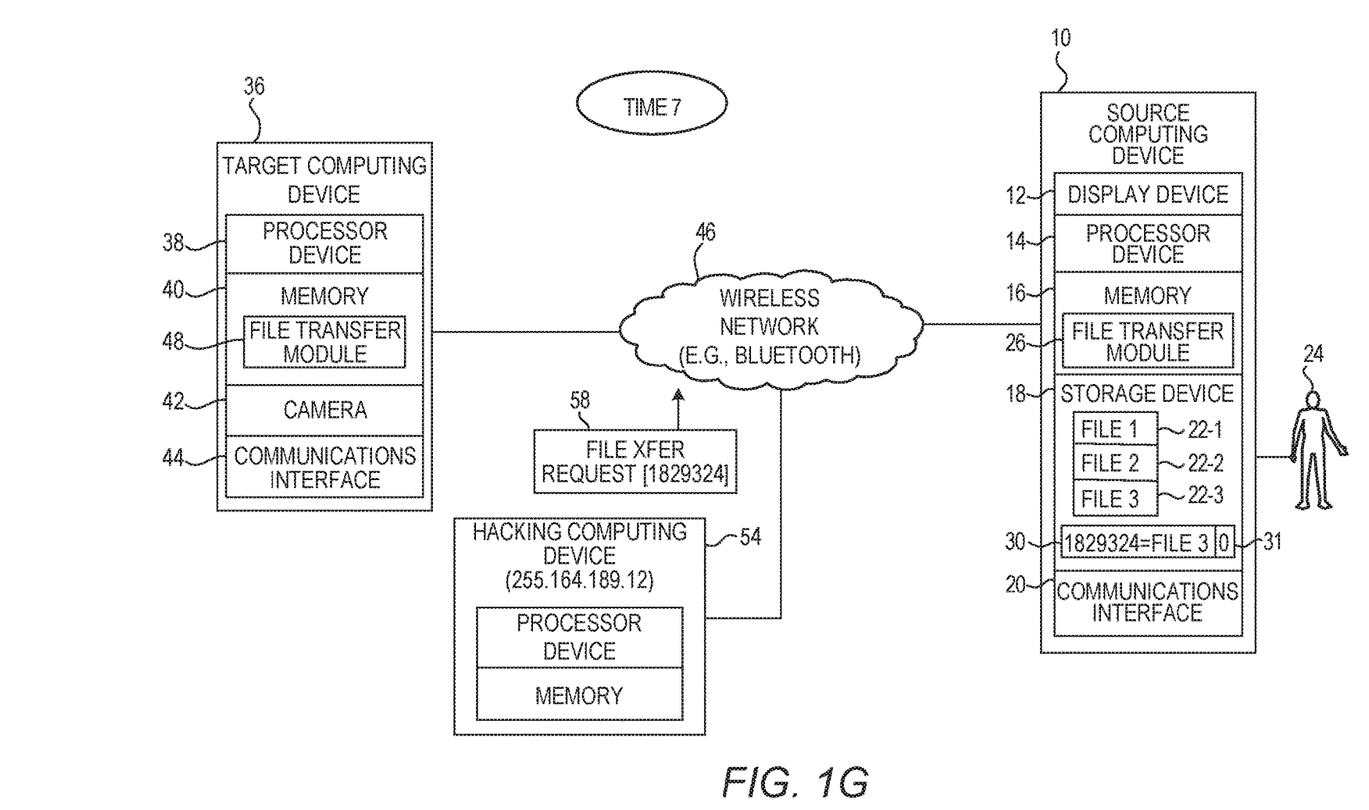

FIG. 1G illustrates the source computing device 10, the target computing device 36, and the hacking computing device 54 at a subsequent point in time. Assume that the hacking computing device 54 intercepts the first file transfer request 52, and generates a second file transfer request 58 that is essentially a copy of the first file transfer request 52. The hacking computing device 54 sends the second file transfer request 58 to the source computing device 10.

Figure 1H:
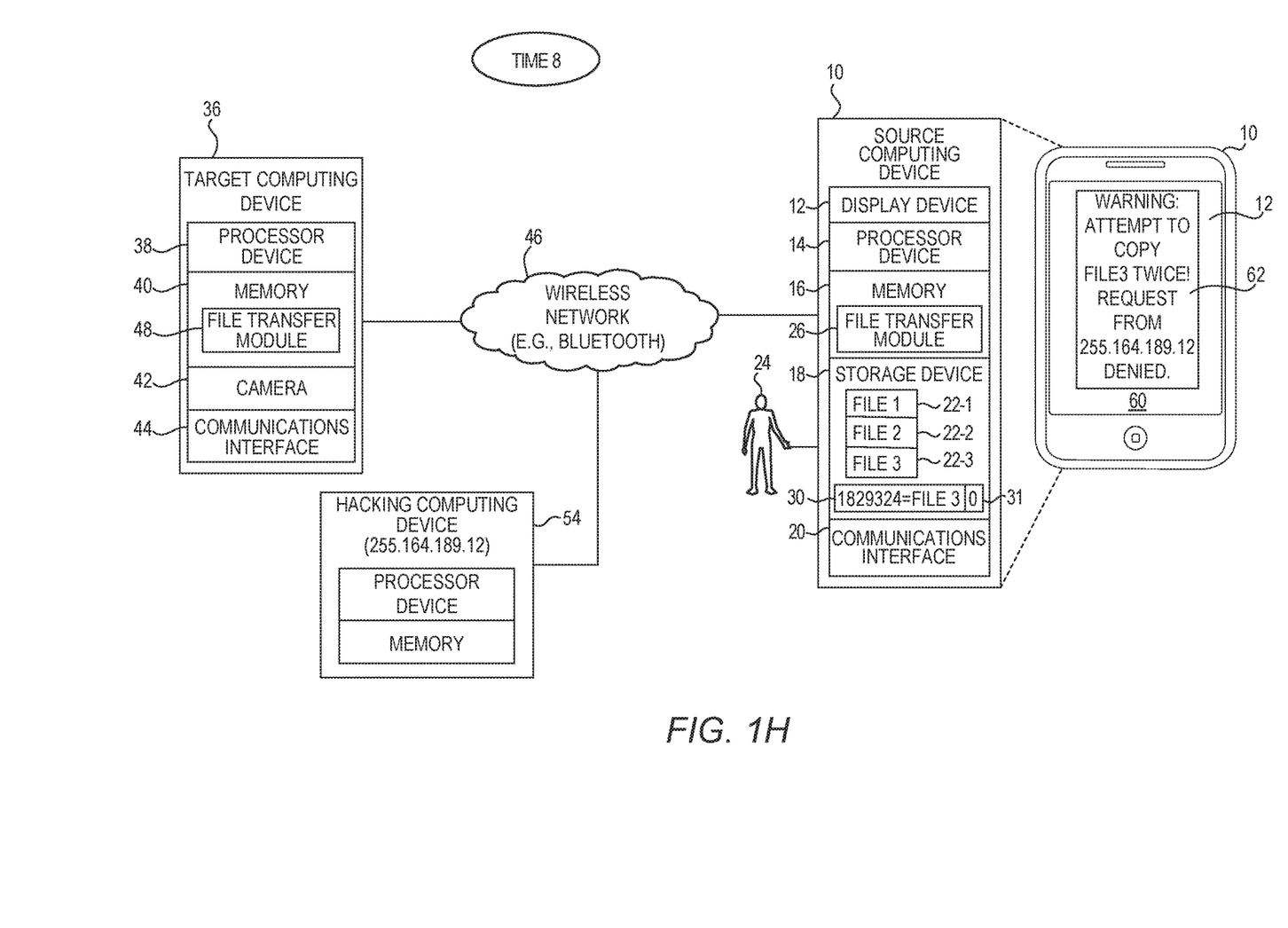

FIG. 1H illustrates the source computing device 10 processing the second file transfer request 58 according to one example. The source computing device 10 receives the second file transfer request 58 and extracts the unique ID from the second file transfer request 58. The source computing device 10 determines that the association between the unique ID and the file 22-3 is not valid based on the valid association flag 31, and thus this request constitutes a second attempt to utilize the unique ID to copy the file 22-3. In response, the source computing device 10 may perform an action to alert the user 24 that multiple requests to copy a file were received. In one example, the source computing device 10 may generate a user interface 60 that includes a message 62 that indicates multiple attempts to copy the file 22-3 have been received.

Figure 2:
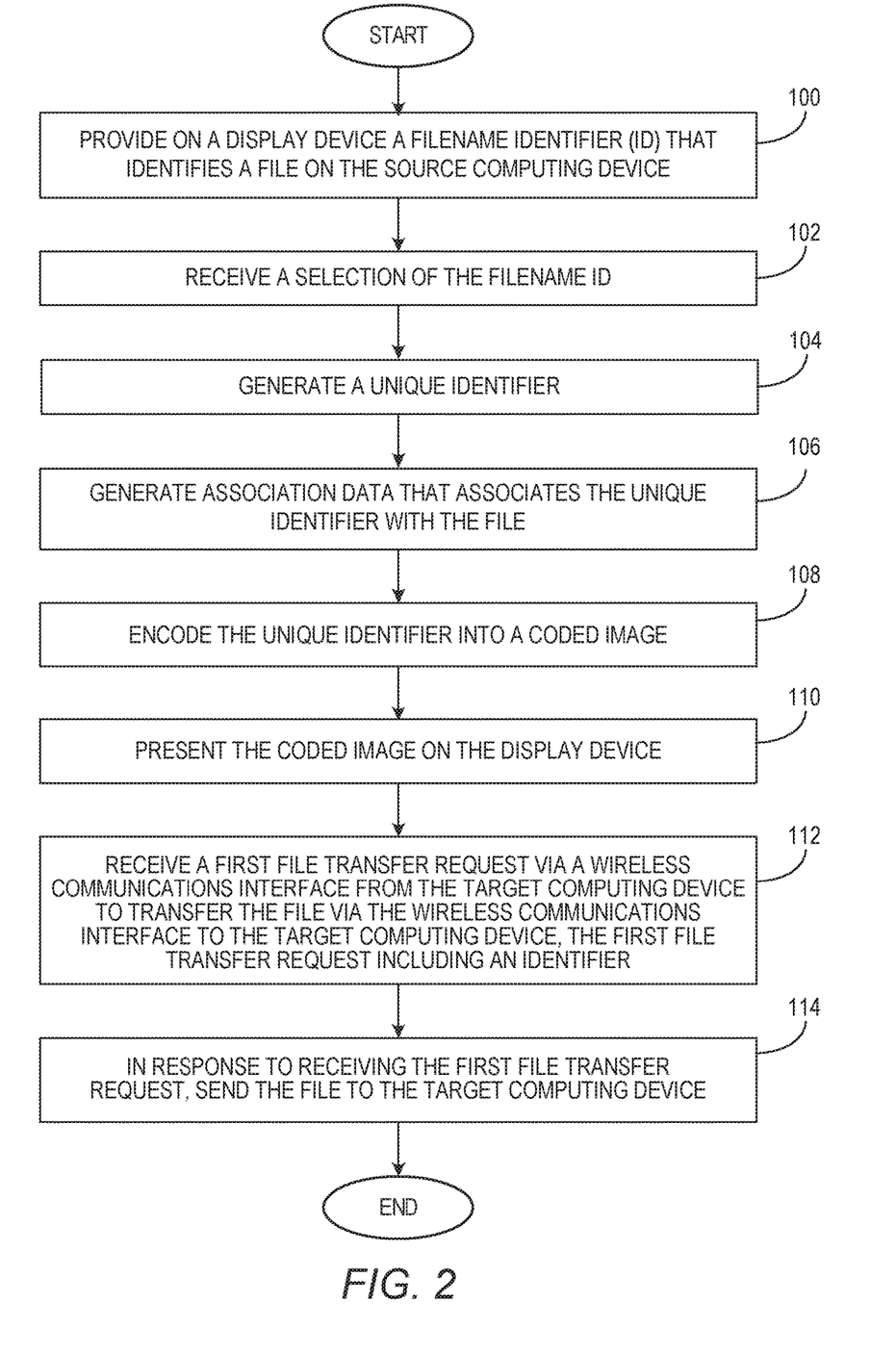
FIG. 2 is a flowchart of a camera-activated mechanism for transferring data from a source computing device to a target computing device according to one example.

FIG. 2 is a flowchart of a method for transferring data from the source computing device 10 to the target computing device 36 according to one example. FIG. 2 will be discussed in conjunction with FIGS. 1A-1H. The source computing device 10 provides on the display device 12 one or more filename identifiers that identify the files 22-1-22-3 stored on the source computing device 10 (block 100). The source computing device 10 receives a selection of a filename ID which, in this example, is the filename ID "File 3" that is associated with the file 22-3 (block 102). The source computing device 10 generates a unique ID, and generates the association data 30 that associates the unique ID with the file 22-3 (blocks 104-106). The source computing device 10 encodes the unique ID into the coded image 32 (block 108). The source computing device 10 presents the coded image 32 on the display device 12 (block 110). The source computing device 10 receives the first file transfer request 52 via the wireless communications interface 20 from the target computing device 36 to transfer the file 22-3 via the wireless communications interface 20 to the target computing device 36 (block 112). The first file transfer request 52 includes an identifier. In response to receiving the first file transfer request 52, the source computing device 10 sends the file to the target computing device 36 (block 114).

Figure 3:
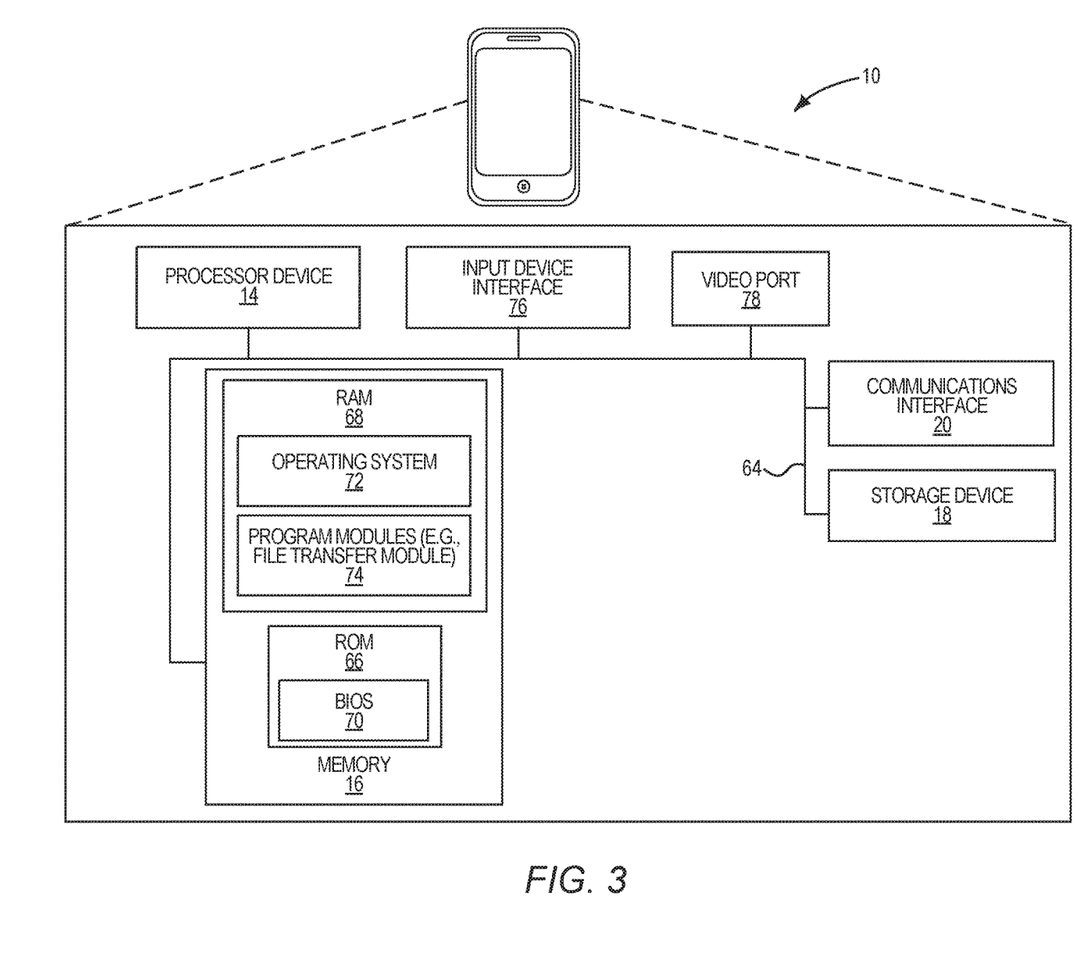
FIG. 3 is a block diagram of a source computing device according to one example.

FIG. 3 is a block diagram of the source computing device 10 suitable for implementing examples according to one example. The source computing device 10 may comprise any computing or electronic device capable of including firmware, hardware, and/or executing software instructions to implement the functionality described herein, such as a computer server, a desktop computing device, a laptop computing device, a smartphone computing tablet, or the like. The source computing device 10 includes the processor device 14, the system memory 16, and a system bus 64. The system bus 64 provides an interface for system components including, but not limited to, the system memory 16 and the processor device 14. The processor device 14 can be any commercially available or proprietary processor device.

The system bus 64 may be any of several types of bus structures that may further interconnect to a memory bus (with or without a memory controller), a peripheral bus, and/or a local bus using any of a variety of commercially available bus architectures. The system memory 16 may include non-volatile memory 66 (e.g., read-only memory (ROM), erasable programmable read-only memory (EPROM), electrically erasable programmable read-only memory (EEPROM), etc.), and volatile memory 68 (e.g., random-access memory (RAM)). A basic input/output system (BIOS) 70 may be stored in the non-volatile memory 66 and can include the basic routines that help to transfer information between elements within the source computing device 10. The volatile memory 68 may also include a high-speed RAM, such as static RAM, for caching data.

The source computing device 10 may further include or be coupled to a non-transitory computer-readable storage medium such as the storage device 18, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 18 and other drives associated with computer-readable media and computer-usable media may provide non-volatile storage of data, data structures, computer-executable instructions, and the like. Although the description of computer-readable media above refers to an HDD, it should be appreciated that other types of media that are readable by a computer, such as Zip disks, magnetic cassettes, flash memory cards, cartridges, and the like, may also be used in the operating environment, and, further, that any such media may contain computer-executable instructions for performing novel methods of the disclosed examples.

A number of modules can be stored in the storage device 18 and in the volatile memory 68, including an operating system 72 and one or more program modules 74, such as the file transfer module 26, which may implement the functionality described herein in whole or in part. It is to be appreciated that the examples can be implemented with various commercially available operating systems 72 or combinations of operating systems 72.

A number of modules can be stored in the storage device 18 and in the volatile memory 68, including, by way of non-limiting example, the file transfer module 26. All or a portion of the examples may be implemented as a computer program product stored on a transitory or non-transitory computer-usable or computer-readable storage medium, such as the storage device 18, which includes complex programming instructions, such as complex computer-readable program code, to cause the processor device 14 to carry out the steps described herein. Thus, the computer-readable program code can comprise software instructions for implementing the functionality of the examples described herein when executed on the processor device 14. The processor device 14, in conjunction with the file transfer module 26 in the volatile memory 68, may serve as a controller, or control system, for the source computing device 10 that is to implement the functionality described herein.

An operator, such as the user 24, may also be able to enter one or more configuration commands through a keyboard (not illustrated), a pointing device such as a mouse (not illustrated), or a touch-sensitive surface such as the display device 12. Such input devices may be connected to the processor device 14 through an input device interface 76 that is coupled to the system bus 64 but can be connected by other interfaces such as a parallel port, an Institute of Electrical and Electronic Engineers (IEEE) 1394 serial port, a Universal Serial Bus (USB) port, an IR interface, and the like.

The source computing device 10 may also include the communications interface 20 suitable for communicating with the network 46 as appropriate or desired. The source computing device 10 may also include a video port 78 configured to interface with the display device 12, to provide information to the user 24.

Individuals will recognize improvements and modifications to the preferred examples of the disclosure. All such improvements and modifications are considered within the scope of the concepts disclosed herein and the claims that follow.

What is claimed is:

1. A method for transferring data from a source computing device comprising a processor device to a target computing device, comprising:
providing on a display device, by the source computing device, a filename identifier (ID) that identifies a file stored on the source computing device;
receiving, by the source computing device, a selection of the filename ID;
generating a unique identifier;
generating association data that associates the unique identifier with the file;
encoding the unique identifier into a coded image;
presenting the coded image on the display device;
receiving a first file transfer request via a wireless communications interface from the target computing device to transfer the file via the wireless communications interface to the target computing device, the first file transfer request including the unique identifier;
accessing the association data that associates the unique identifier with the file;
determining that the unique identifier included in the first file transfer request matches the unique identifier associated with the file prior to sending the file to the target computing device;
responsive to receiving the first file transfer request, sending the file to the target computing device;
invalidating the association data to render invalid any subsequent file transfer request that includes the unique identifier;
receiving a second file transfer request via the wireless communications interface from a device to transfer the file via the wireless communications interface to the device, the second file transfer request including the unique identifier;
determining that no association between the unique identifier and the file exists; and
in response to determining that no association between the unique identifier and the file exists not transferring the file to the device in response to the second file transfer request.

2. The method of claim 1 further comprising presenting a message on the source computing device in response to receiving the second file transfer request.

3. The method of claim 2 wherein the message indicates that the file may have been transferred to an unintended recipient.

4. The method of claim 1 wherein the coded image comprises a quick response (QR) code.

5. The method of claim 1 wherein generating the unique identifier that refers to the file comprises generating a random number, and including the random number in the unique identifier.

6. The method of claim 5 wherein the unique identifier comprises a uniform resource identifier.

7. The method of claim 1 wherein:
providing on the display device the filename ID that identifies the file stored on the source computing device further comprises providing on the display device a plurality of filename IDs, each filename ID identifying a different file stored on the source computing device;
receiving the selection of the filename ID comprises receiving a selection of a group of filename IDs of the plurality of filename IDs, the group of filename IDs identifying a corresponding group of files;
generating association data that associates the unique identifier with the file comprises generating association data that associates the unique identifier with the group of files; and
responsive to receiving the first file transfer request, sending the file to the target computing device further comprises responsive to receiving the first file transfer request, sending the group of files to the target computing device.

8. The method of claim 1 further comprising:
reading, by the target computing device via a camera, the coded image;
decoding the coded image to generate the unique identifier;
generating the first file transfer request with the unique identifier;
sending the first file transfer request to the source computing device; and
receiving the file from the source computing device.

9. The method of claim 1 wherein receiving the first file transfer request via the wireless communications interface from the target computing device to transfer the file via the wireless communications interface to the target computing device comprises receiving the first file transfer request on a predetermined port via the wireless communications interface from the target computing device to transfer the file via the wireless communications interface to the target computing device.

10. A source computing device comprising:
a communications interface to communicate with a network;
a display device;
a processor device coupled to the communications interface and the display device, the processor device to:
provide on the display device a filename identifier (ID) that identifies a file stored on the source computing device;
receive a selection of the filename ID;
generate a unique identifier;
generate association data that associates the unique identifier with the file;
encode the unique identifier into a coded image;
present the coded image on the display device;
receive a first file transfer request via the communications interface from a target computing device to transfer the file via the communications interface to the target computing device, the first file transfer request including the unique identifier;
access the association data that associates the unique identifier with the file;
determine that the unique identifier included in the first file transfer request matches the unique identifier associated with the file prior to sending the file to the target computing device;
responsive to receiving the first file transfer request, send the file to the target computing device;
invalidate the association data to render invalid any subsequent file transfer request that includes the unique identifier;
receive a second file transfer request via a wireless communications interface from a device to transfer the file via the wireless communications interface to the device, the second file transfer request including the unique identifier;

determine that no association between the unique identifier and the file exists; and in response to determining that no association between the unique identifier and the file exists not transfer the file to the device in response to the second file transfer request.

11. The source computing device of claim 10 wherein to:

provide on the display device the filename identifier (ID) that identifies the file stored on the source computing device the processor device is further to provide on the display device a plurality of filename IDs, each filename ID identifying a different file stored on the source computing device;

receive the selection of the filename ID the processor device is further to receiving a selection of a group of filename IDs of the plurality of filename IDs, the group of filename IDs identifying a corresponding group of files;

generate association data that associates the unique identifier with the file the processor device is further to generating association data that associates the unique identifier with the group of files; and responsive to receiving the first file transfer request, send the file to the target computing device the processor device is further to, responsive to receiving the first file transfer request, send the group of files to the target computing device.

12. The source computing device of claim 10 wherein to receive the first file transfer request via the communications interface from the target computing device to transfer the file via the communications interface to the target computing device the processor device is further to receive the first file transfer request on a predetermined port via the wireless communications interface from the target computing device to transfer the file via the wireless communications interface to the target computing device.

13. A computer program product for transferring data from a source computing device to a target computing device, the computer program product stored on a non-transitory computer-readable storage medium and including instructions to cause a processor device to carry out steps of:

providing on a display device a filename identifier (ID) that identifies a file stored on the source computing device;

receiving a selection of the filename ID;

generating a unique identifier;

generating association data that associates the unique identifier with the file;

encoding the unique identifier into a coded image;

presenting the coded image on the display device;

receiving a first file transfer request via a wireless communications interface from the target computing device to transfer the file via the wireless communications interface to the target computing device, the first file transfer request including the unique identifier;

accessing the association data that associates the unique identifier with the file;

determining that the unique identifier included in the first file transfer request matches the unique identifier associated with the file prior to sending the file to the target computing device;

responsive to receiving the first file transfer request, sending the file to the target computing device;

invalidating the association data to render invalid any subsequent file transfer request that includes the unique identifier;

receiving a second file transfer request via the wireless communications interface from a device to transfer the file via the wireless communications interface to the device, the second file transfer request including the unique identifier;

determining that no association between the unique identifier and the file exists; and in response to determining that no association between the unique identifier and the file exists not transferring the file to the device in response to the second file transfer request.

14. The computer program product of claim 13 wherein:

providing on the display device the filename ID that identifies the file stored on the source computing device further comprises providing on the display device a plurality of filename IDs, each filename ID identifying a different file stored on the source computing device;

receiving the selection of the filename ID comprises receiving a selection of a group of filename IDs of the plurality of filename IDs, the group of filename IDs identifying a corresponding group of files;

generating association data that associates the unique identifier with the file comprises generating association data that associates the unique identifier with the group of files; and responsive to receiving the first file transfer request, sending the file to the target computing device further comprises responsive to receiving the first file transfer request, sending the group of files to the target computing device.

* * * * *